Feb. 12, 1935.　　　　J. P. TRIPP　　　　1,991,128
ARC WELDING APPARATUS
Filed March 29, 1933　　　6 Sheets-Sheet 1

FIG.1

INVENTOR
JOHN. P. TRIPP
BY J. D. O'Connell
ATTORNEY

Feb. 12, 1935.   J. P. TRIPP   1,991,128
ARC WELDING APPARATUS
Filed March 29, 1933   6 Sheets-Sheet 3

INVENTOR
JOHN. P. TRIPP
BY J. D. O'Connell
ATTORNEY

INVENTOR
JOHN P. TRIPP
BY J.T. O'Connell
ATTORNEY

FIG.12

FIG.13 INVENTOR JOHN P. TRIPP
BY J.L. O'Connell
ATTORNEY

Patented Feb. 12, 1935

1,991,128

UNITED STATES PATENT OFFICE 1,991,128

ARC WELDING APPARATUS

John P. Tripp, Montreal, Quebec, Canada

Application March 29, 1933, Serial No. 663,321

11 Claims. (Cl. 219—8)

This invention relates to arc-welding apparatus for use in connection with the seam-welding of plates or cylindrical objects such as sheet metal pipes, tanks and the like.

An object of the present invention is to provide a generally improved seam-welding apparatus which lends itself to the use of heavily coated electrodes and comprises, as one of its features, an electrode feed mechanism including a shunt wound feed regulating motor that is controllable, in a very simple manner, to feed the electrode to the work at a comparatively slow rate prior to the striking of the arc and then at a rate dependent upon the setting of a field regulating rheostat around which the shunt field energizing current of the electrode motor is shunted until after the arc has been established.

Another feature of the invention resides in the provision of an electrode elevating or arc-striking mechanism that is operated by a solenoid energized by current derived from a constant voltage source separate from the welding circuit so that, during the welding operation, the arc striking mechanism remains unaffected by the fluctuations of the welding current.

A further feature resides in the provision of an adjustable speed direct current motor that may be operated at uniform velocity to impart travelling movement to the electrode or to the work at any desired rate of speed relative to the rate at which the electrode is fed toward the work to maintain the arc, said motor being provided with shunt field regulation and being preferably energized from the same source as that to which the arc-striking solenoid is connected.

A further feature resides in a particular mounting of the electrode feed mechanism and the arc-striking mechanism to provide a unitary compact welding head assembly that may be readily adjusted in various directions to suit the size of the work and to provide for the inside or outside welding of either longitudinal or circumferential seams.

Other objects, characteristic features, and advantages of the invention become apparent from the following detailed description taken in connection with the accompanying drawings, in which—

Figures 3, 4, 5:
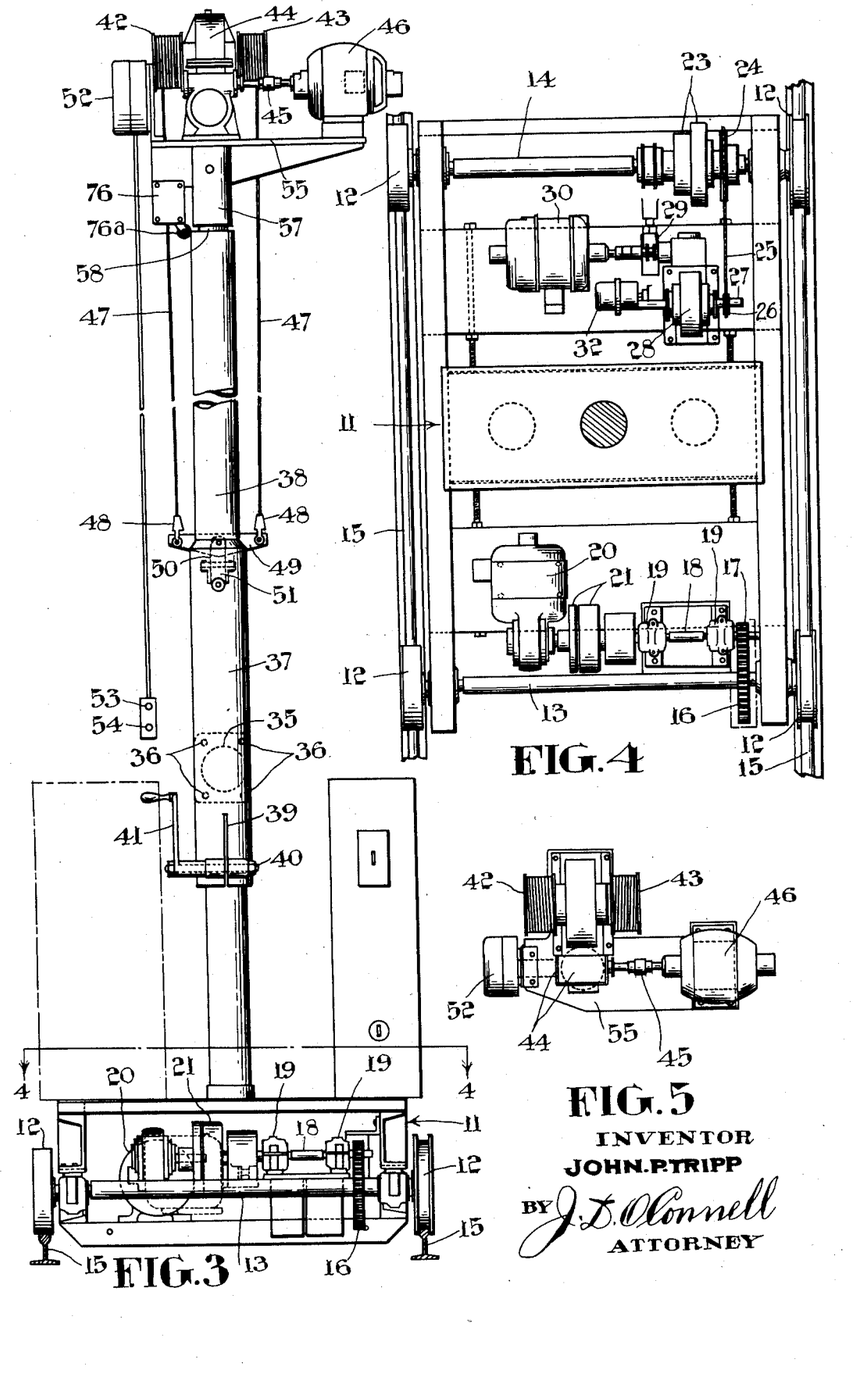
Fig. 3 is a rear elevation of the apparatus appearing in Figs. 1 and 2.
Fig. 4 is a sectional view substantially along the line 4—4 of Fig. 3.
Fig. 5 is a top plan view of a hoisting drum assembly forming part of said apparatus.

Referring more particularly to the drawings, 11 designates a power driven truck equipped with supporting wheels 12 attached to rotary axles 13 and 14, and arranged to travel on suitable guide rails 15, the wheels on one side of the truck being flanged to ensure travel parallel with the said rails. Axle 13 (see Fig. 4) carries a fixed gear 16 meshing with a gear 17 fixed to one end of a shaft 18. This shaft 18 is journalled in suitable bearings 19 and is driven, at times, by an electric motor 20 through the agency of a suitable magnetic clutch 21, the magnet of which is energized to complete the drive connection between the motor and the axle 13 only when the motor circuit is closed to effect rapid travel of the truck along the rails 15. The remaining truck axle 14 is equipped with a magnetic clutch 23 one half of which is keyed to said axle while the other half carries a sprocket wheel 24 and is freely rotatable on the axle except when the magnet of the clutch is energized. A chain 25 connects the sprocket 24 with a sprocket 26 on the slow speed shaft 27 of a worm gear speed reducer 28, the high speed shaft 29 of which is coupled to the armature shaft of an operating motor 30. When operating current is supplied to the motor 30, the magnet of clutch 23 is automatically energized to establish a drive connection between the motor and the axle 14.

During the welding operation, the motor 30 and the clutch 23 are energized as hereinafter described to propel the truck along the track rails 15 at a welding speed which may be predetermined by the operator through the agency of a suitable rheostat. At the completion of the run, the motor 30 and clutch 23 are deenergized so that the truck 11 may then be moved backwards either by hand or by operation of the motor 20. The motor 20 is used only as a rapid travel motor for quickly moving the truck 11 to a desired position along the track rails 15, this motor being employed to propel the truck to a proper position with respect to the work before commencement of the welding operation and to return the truck to its starting position after it has completed a run at welding speed under the influence of the welding travel motor 30.

Figure 1:
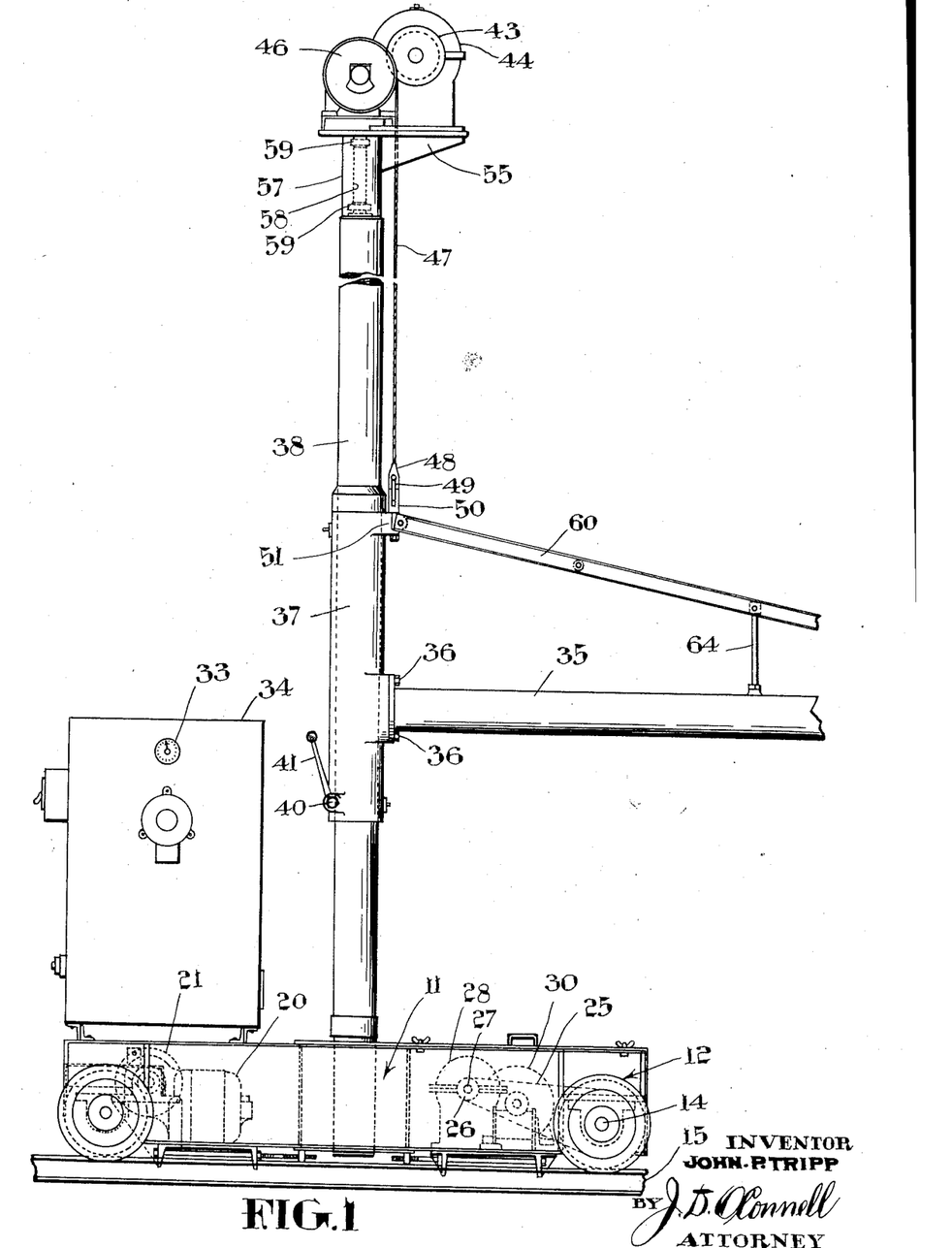
Fig. 1 is a view, in side elevation, of the supporting truck and other parts of the welding apparatus provided in accordance with this invention.

The travelling speed of the truck during the welding operation may be continuously indicated by means of an electric tachometer 32 (Fig. 4) which is driven by the motor 30 through the medium of the reducing gearing 28 and serves, in a well known manner, to actuate a gauge 33 on the main control panel 34, (Fig. 1.)

The welding arm appearing at 35 is in the form of a horizontal boom having one end bolted, as at 36, to a sleeve 37 which slides vertically on a guide column 38 rising from the truck 11. The lower end of sleeve 37 is split as indicated at 39 (see Fig. 3) and is adapted to be clamped to the column by means of the clamping bolt 40 and the bolt operating handle 41. When the bolt 40 is turned to release the sleeve 37 from clamping engagement with the column 38, the sleeve may be adjusted on the column to raise or lower the horizontal welding arm 35 to provide for the welding of pipes of different diameters. The raising and lowering of the sleeve 37 is accomplished through the agency of a suitable hoisting mechanism mounted on the upper end of the column 38. As here shown, said hoisting mechanism comprises a pair of hoisting drums 42 and 43 keyed to the slow speed shaft of a speed reducer 44, the high speed shaft of which is coupled, as at 45, to the armature shaft of a hoisting motor 46. Wound on the drums 42 and 43 are a pair of hoisting cables 47 the free ends of which are attached, as at 48, to the ends of an equalizer bar 49, the central portion of which is pivoted to a clevis 50 rotatably mounted in a lug 51 provided at the upper portion of the sleeve 37. When sleeve 37 is free to travel on the column 38 said sleeve, together with the horizontal welding arm 35, may be raised or lowered to any desired position of elevation by operation of the motor 46 and the hoisting drums 42 and 43. The extent and direction of the operation of the hoisting mechanism may, as herein shown, be conveniently controlled through the agency of a magnetic reversible starter 52 which is operated in response to the actuation of suitable push button switches appearing at 53 and 54.

Figures 2, 6, 7:
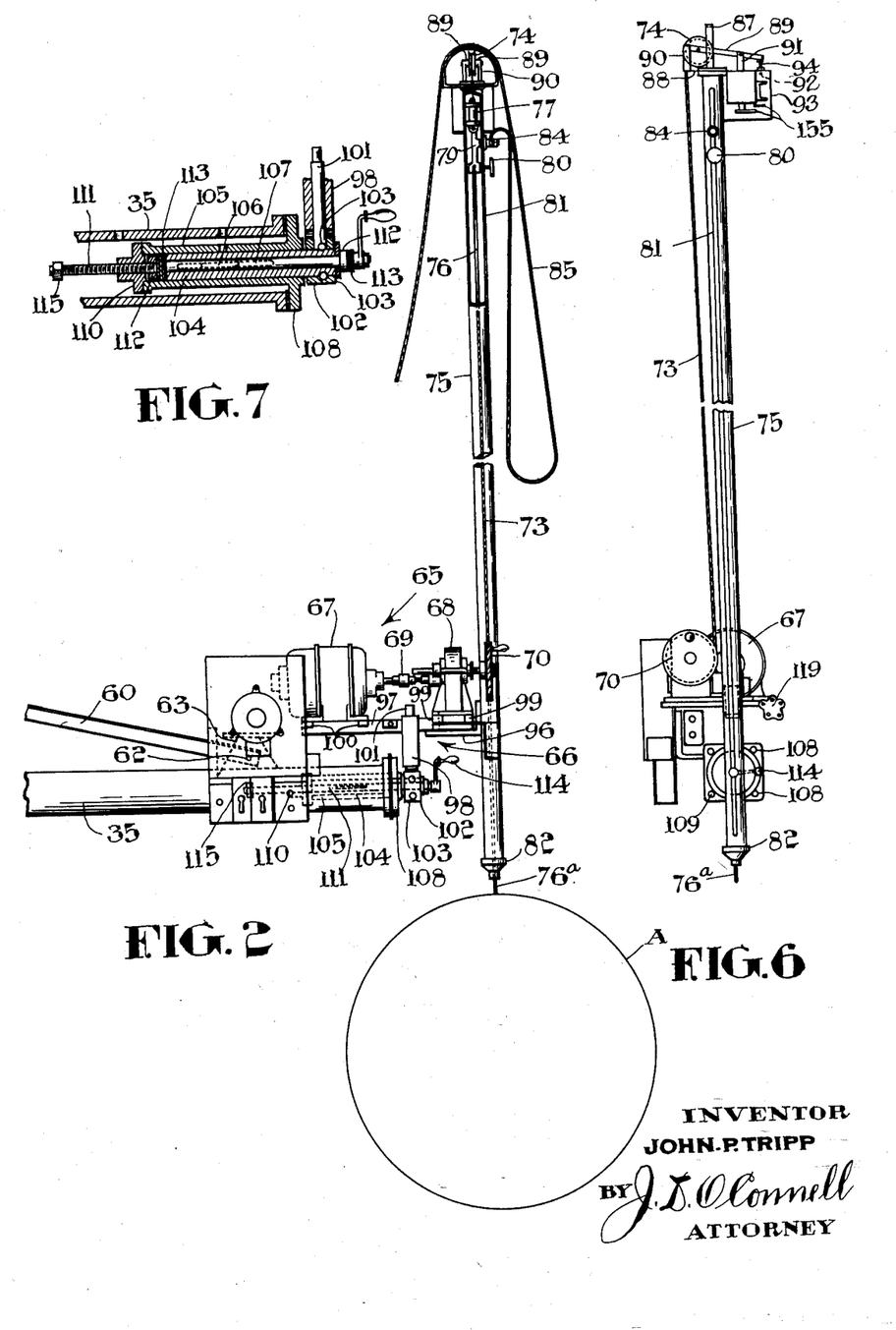
Fig. 2 is a similar view of the remaining parts of said apparatus, this view being a continuation of Fig. 1.
Fig. 6 is a view, in front elevation, of the assembly appearing in Fig. 2.
Fig. 7 is an enlarged detail view, in vertical longitudinal section, of a portion of the assembly appearing in Figs. 2 and 6.

The component elements of the hoisting mechanism comprising the hoisting drums 42 and 43, the speed reducer 44, the motor 46 and the starter 52 are carried by a base casting 55 which is rotatable around the center of the column 38 to correspond with the position of the welding arm 35 which, when the clamping engagement between the sleeve 37 and the column 38 is released, may be turned about the column to occupy a position parallel with the direction of travel of the truck or at right angles thereto. As here shown, the base casting 55 is provided with a depending sleeve 57 fitting over a pivot pin 58 provided at the upper end of the column 38, said pin being rotatably received in suitable bearings 59 arranged within the bore of the sleeve 57. In order to prevent overtravel of the sleeve 37 in the hoisting direction a limit switch 76 is preferably attached to the casting 55 so that the arm 76a of this switch will be engaged and operated by the sleeve to open the circuit of the motor 46 when the sleeve 37 reaches a certain point in its upward travel on the column 38. In order to assist in supporting the arm 35 from the sleeve 37, a pair of inclined boom stays 60 are provided. As shown in Figs. 1 and 2, these stays are in the form of angle irons having their inner ends pivoted to the sleeve lug 51 and their outer ends connected as at 62, to suitable plates 63 carried by the outer portion of the arm 35. If desired, one or more vertical struts 64 may be connected between the stays and the arm 35 as shown more particularly in Fig. 1.

At its outer end arm 35 carries the welding head assembly generally indicated at 65 (Fig. 2 and 6 to 13 inclusive). This assembly is a self-contained unit that may be adjusted to various positions with respect to arm 35 or readily detached therefrom. It comprises a frame member 66 on which is mounted a motor 67 and worm gear reducer 68, the latter having its high speed shaft directly connected to the motor by a suitable coupling 69. A rope drum 70, loosely mounted on the slow speed shaft of the speed reducer 64, is provided (see Fig. 12) with a spring pressed pawl 71 engaging a ratchet 72 fixed to said shaft. A light flexible rope 73, having one end attached to the drum 70, is carried upwardly over a sheave 74 at the upper end of a vertical tube 75 which serves as a guide tube for the welding electrode 76a. After a half turn around the sheave 74 the rope 73 passes downwardly into the tube 75 where its remaining end is connected to a guide piston 77 operating in said tube. The lower end of piston 77 is pivotally connected, as at 78 to the upper end of an electrode socket 79, the pivotal connection between these parts being such that the piston is electrically insulated from the socket. At its lower end the socket 79 is provided with a suitable recess in which the upper end of the electrode 76a is firmly secured by a clamping screw 80 which, during movement of the socket, travels in an elongated slot 81 provided in the wall of the tube 75. At its lower end the electrode 76a passes through a central guide opening formed in a cap 82 closing the lower end of the tube.

The electrode socket 79 also carries a terminal 84 to which current is supplied by a conductor 85 which, for convenience may be arranged to pass over an inverted U-shaped guide member 87 carried by a plate 88 mounted on the upper end of the tube 75. Plate 88 closes the upper end of tube 75 except for a small opening through which the electrode supporting cord 73 passes into the upper end of the tube.

The sheave 74 is carried between a pair of levers 89 which are pivoted at one end to posts 90 rising from the plate 88. Adjacent their free ends these levers are connected to the movable core 91 of a shunt wound arc-striking solenoid 92 which is fastened to the underside of the plate 88 within a suitable casing 93. When the free ends of the levers 89 are in their lowered position they engage adjusting screws 94 carried by the plate 88. By adjusting these screws it is possible to adjust the lift which, as hereinafter described, is imparted to the sheave 74 and, consequently, to the electrode 76a when the solenoid 92 is energized to strike an arc between the electrode and the work.

The tube 75 is fastened, by a bracket 96, to one end of the frame 66 which, as previously stated, carries the electrode feed controlling mechanism comprising the motor 67, speed reducer 68, and ratchet drum 70. The design of the frame 66 is clearly shown in Figs. 2 and 11. It comprises a central bar member 97 provided intermediate its length with an integral bearing sleeve 98 having a cylindrical bore. At one side of the bearing sleeve the bar 97 is provided with a pair of laterally projecting bracket arms 99 on which the gear reducer 68 is mounted. At the opposite side of said sleeve the bar 97 is provided with oppositely projecting bracket arms 100 on which the motor 67 is mounted.

Frame 66 is turnably mounted on a cylindrical post 101 extending upwardly within the sleeve 98. The lower end of said post is in the form of a collar 102 which is rigidly fixed, by suitable bolts 103, or otherwise, to the outer end of a sleeve 104 which is axially slidable within an outer guide sleeve 105. As shown to advantage in Fig. 7 the sleeve 104 is provided with a key 106 which slides in a keyway 107 in the guide sleeve 105 and serves to hold the sleeve 104 against turning movement. Sleeve 105 is housed in the outer end of the welding arm 35 to which it is attached by the flange 108 and bolts 109. A cap member 110, closing the inner end of sleeve 105, is provided with a central threaded opening for the passage of a threaded adjusting screw 111 which also passes loosely through the bore of sleeve 104. Sleeve 104 is held against axial movement relative to the screw 111 by means of the nuts 112 and the thrust washers 113 so that said sleeve is contained to move inwardly or outwardly with the adjusting screw when the latter is turned by means of the handle 114 at its outer end. A stop nut 115, at the inner end of the adjusting screw, limits the outward travel thereof relative to the guide sleeve 105. From this description it will be apparent that, by the operation of the screw 111, the frame 66 may be adjusted in the axial direction of the welding arm 35 whenever slight adjustments of this nature are necessary to properly position the electrode with respect to the work.

Figures 8, 9:
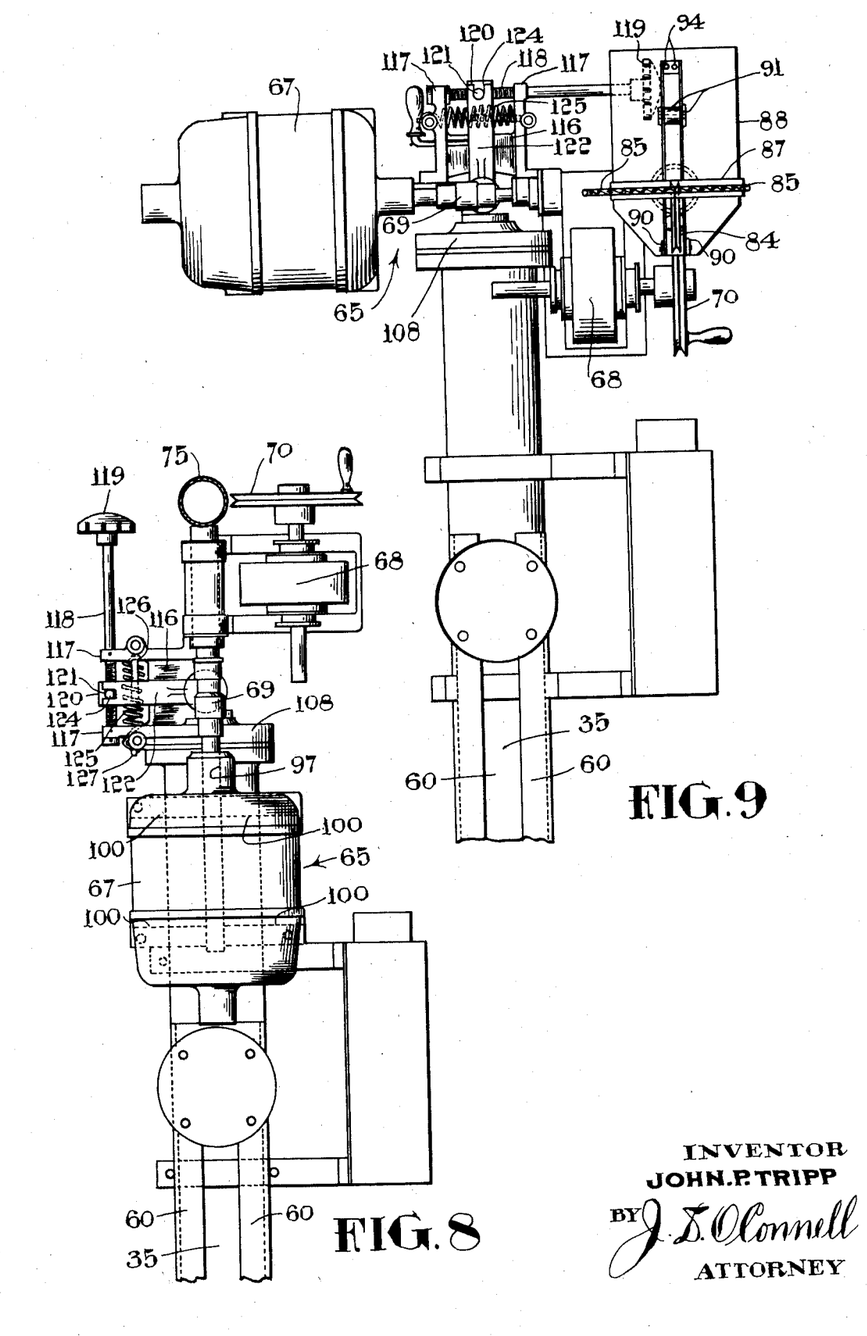
Fig. 8 is principally an enlarged top plan view of the assembly appearing in Fig. 2, certain parts being omitted for the sake of clearness.
Fig. 9 is a complete top plan view of the assembly appearing in Fig. 2 but with certain parts shown in a different position.
Figures 10, 11:
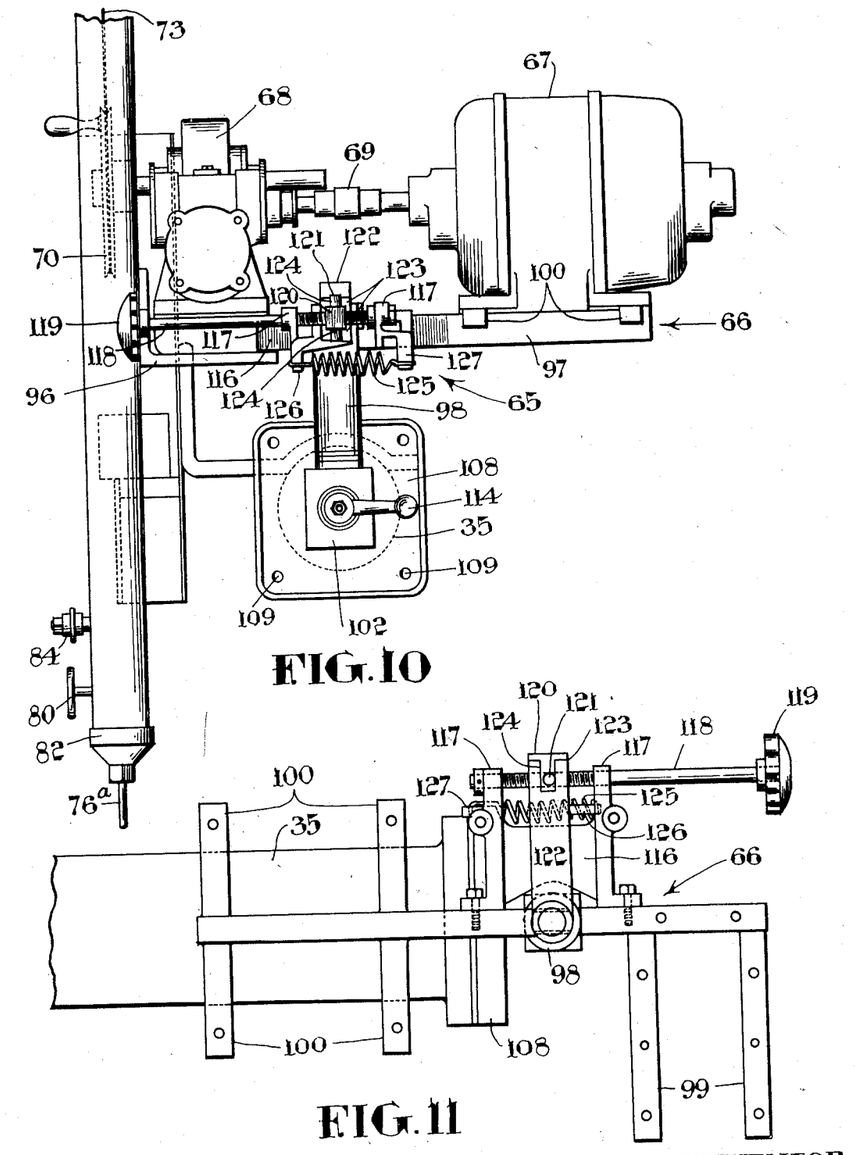
Fig. 10 is an enlarged view, similar to Fig. 6 but showing certain parts arranged in accordance with Fig. 9.
Fig. 11 is a top plan view of an adjustable frame which supports most of the parts appearing in Figs. 2, 6 and 8 to 10 inclusive.

The frame 66 may be initially mounted on the post 101 to lie parallel with the welding arm 35 as in Figs. 2, 8 and 11 or at right angles to said arm as in Figs. 9 and 10. When arranged in either of these two positions slight angular adjustments of the frame may be resorted to to correct any tendency of the arc to deviate from the desired line of weld. In the present instance this is accomplished in the following manner. A bracket 116 is fastened to one side of the frame 66 and presents a pair of spaced arms 117 provided with suitable bearings in which is journalled a rotary screw 118 having an operating handle 119 at one end. This screw is threaded through a cross head 120 provided with upper and lower pin projections 121. A laterally projecting arm, indicated at 122, has one end rigidly secured to the upper end of the post 101 which projects beyond the upper end of the frame sleeve 98. The other end of arm 122 terminates in a fork 123 embracing the crosshead 120 and provided with slots 124 receiving the pin projections 121. A coiled spring 125 has one end connected to a lug 126 depending from the arm 122 and the other end connected to a similar lug 127 depending from one of the side arms 117 of the frame 66. When the handle 119 is turned in the proper direction the resulting travel of the screw 118 through the cross head 120 causes the frame 66 to turn about the post 101 to a different angular position against the resistance of the spring 125, thus enabling slight adjustment to be made in the positioning of the electrode 76a with reference to the work to correct any tendency of the arc to deviate from the desired line of weld during the welding operation. In some instances the tendency of the arc to deviate from the desired line of weld may also be corrected by operating the handle 114 to adjust the welding head assembly in the axial direction of the arm 35.

A further feature of the present invention resides in the provision of certain electrical connections and controls for governing the operation of the welding generator, the welding travel motor 30, the electrode feed motor 67 and the arc striking solenoid 92. These connections and controls are diagrammatically illustrated as part of the wiring diagrams appearing in Fig. 13. As here shown the welding circuit, including the generator 128, has one side 129 connected to ground and the other side 130 connected to the electrode 76a. This welding circuit also includes a reactor 131 and a coil operated contactor 132, the latter having its operating coil 133 shunted across the reactor in series with a pair of normally closed contacts 134. The generator 128 is provided with a separately excited field winding 135, connected across the terminals of the exciter 136 in series with an adjustable rheostat 137 and a pair of normally open contacts 138.

Figures 12, 13:
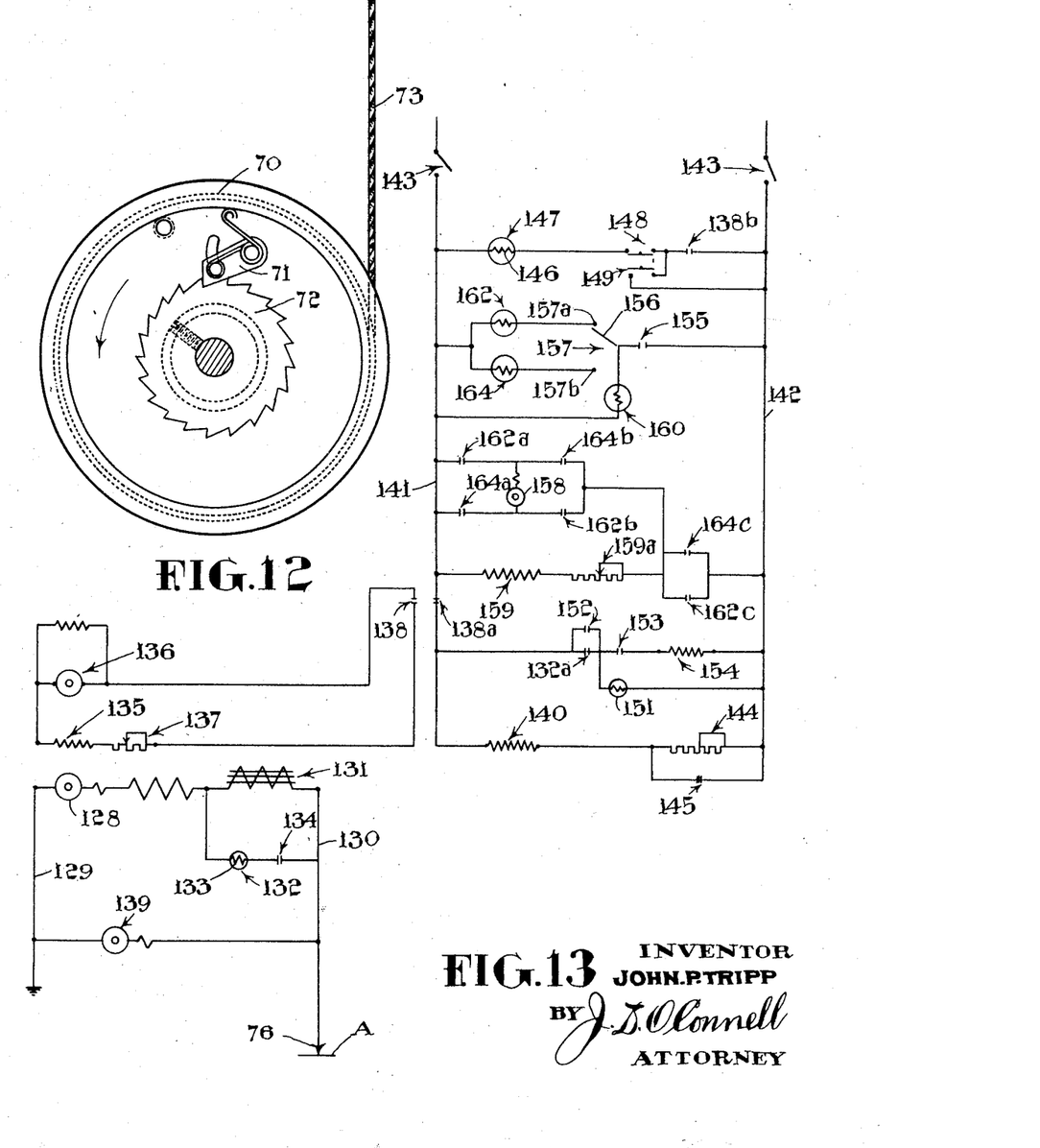
Fig. 12 is an enlarged detail view of a ratchet drum assembly forming part of the apparatus disclosed in the preceding figures.
Fig. 13 is a wiring diagram showing certain electrical connection and control mechanism forming part of the present invention.

The electrode feed motor is represented in Fig. 13 by the armature 139 and the shunt field winding 140, the former being connected directly across the welding circuit 129 and 130 and the latter being connected between a pair of conductors 141 and 142 which are adapted to be energized from a constant voltage source of direct current (not shown) by closure of the switches appearing at 143. An adjustable rheostat 144 and a pair of normally closed contacts 145 are shown connected in parallel with each other to provide two different paths for the flow of current between the motor shunt field 140 and the conductor 142 whenever such current flow is rendered possible by closure of a break in the conductor 141 represented by the normally separated contacts 138a.

The contacts 138 in the field exciting circuit of the welding generator and the contacts 138a in the conductor 141 are arranged to be closed simultaneously whenever there is current flow in the operating coil 146 of the contactor indicated at 147. Operation of this contactor 147 and the consequent opening and closing of the contacts 138 and 138a is controlled by the normally closed stop switch appearing at 148 and the normally open starting switch appearing at 149. Momentary closure of the starting switch 149 completes the connection between the closed switch 148 and the conductor 142, thus operating the contactor 147 to close the contacts 138 and 138a. Contactor 147 also operates to close a pair of normally open contacts 138b to provide a direct connection between the stop switch 148 and the conductor 142 so that the operating coil of contactor 147 will continue to be energized, even after the starting switch 149 is permitted to open, so long as the stop switch 148 remains closed.

The closure of the contacts 138 energizes the welding generator so that a welding potential is immediately available in the welding circuits 129 and 130. The simultaneous closure of the contacts 138a energizes the electrode feed motor so that the ratchet 72 on the motor shaft (see Fig. 12) is turned in the direction indicated by the arrow which permits turning of the ratchet drum 70 in the same direction in response to the pull exerted on the rope 73 by the weight of the electrode assembly which is attached to the free end of said rope as previously described. The turning speed of the ratchet drum 70 and, consequently, the rate at which the electrode 76a is fed to the work is regulated at all times by the operating speed of the electrode feed motor. Prior to the actual striking of the arc the electrode feed motor is operated at a comparatively slow rate of speed since, at this time, the short circuiting of the rheostat 144 by the closed contacts 145 ensures full field on the motor regardless of the setting of the rheostat and causes the electrode 76a to be initially lowered into contact with the work at a comparatively slow speed which favors striking of the arc. When the electrode 76a contacts with the work represented at A in Fig. 13, the electrode feed motor is short circuited and immediately stops. At the same instant a flow of current is set up in the welding circuit and a small portion of this current is shunted through the operating coil 133 of the contactor 132 which operates to close a pair of normally separated contacts 132a connected between the direct current conductors 141 and 142 in series with a further coil operated contactor indicated at 151. The resulting operation of contactor 151 closes the normally open contacts 152 and 153 which are also connected across the conductors 141 and 142 in series with the operating coil 154 of the arc striking solenoid. When coil 154 is thus energized the solenoid core 91 (Fig. 6) together with the levers 89, the sheave 74, and the electrode 76a are elevated to strike the arc. Before the solenoid core 91 reaches the upper limit of its travel it closes a pair of contacts 155 (Figs. 6 and 13) to complete a path for the flow of current between the conductor 142 and the movable contact 156 of a switch 157 that controls the direction of the welding travel motor 30 which is represented in Fig. 13 by the armature 158 and the shunt field winding 159. The closure of contacts 155 also serves to connect a coil operated contactor 160 across the conductors 141 and 142. Contactor 160 thereupon operates to open the normally closed contacts 134 and 145. Opening of contacts 134 de-energizes the contactor 132 and results in reopening of the contacts 132a. This cutting out of contactor 132 immediately following striking of the arc is desirable since, owing to the fluctuating nature of the welding current by which it is energized, the contactor 132 would be apt to set up undesirable vibrations if left continuously in circuit during the welding operation. The opening of the contacts 145 in response to operation of the coil 160 disrupts the shunt connection around the rheostat 144 so that the setting of the latter determines the length of the arc by regulating the rate at which the electrode is lowered toward the work during the making of the weld.

Assuming contacts 155 to be closed, the setting of the switch 157 determines the direction in which the power driven truck 11 is propelled by the welding travel motor 30. If the movable switch contact 157 is engaged with the stationary contact 157a this energizes a contactor 162 which immediately closes the normally open contacts appearing at 162a, 162b and 162c. The closure of these last mentioned contacts connects the shunt field 159 of the welding travel motor across the conductors 141 and 142 in series with an adjustable rheostat 159a and also provides a path for the flow of current through the armature 158 in a direction such that the welding travel motor is energized to propel the truck 11 forwardly during the welding operation at a speed determined by the setting of the rheostat 159a. When the welding travel motor and the truck 11 are to be operated in the reverse direction the movable contact 156 of switch 157 is engaged with the stationary contact 157b. This energizes a contactor 164 which operates to close the normally separated contacts appearing at 164a, 164b and 164c, thereby energizing the shunt field 159 and the rheostat 159a and causing current to flow through the armature 158 of the welding travel motor in a direction opposite to that provided for by the operation of contactor 162.

From the foregoing description it will be seen that, while the operation of the arc striking solenoid is initiated by the welding current, the solenoid is thereafter energized solely from a constant voltage direct current source represented by the conductors 141 and 142. As a consequence undesirable fluctuations of the arc striking solenoid in response to the fluctuations of the welding current are completely avoided.

It will also be seen that the electrode feed motor provided in accordance with this invention is a plain shunt wound motor having its armature directly connected across the welding circuit without the interposition of resisters that would tend to retard the speed regulation of the motor in response to fluctuations in the welding potential. As regards the necessary slow speed operation of the electrode feed motor prior to the striking of the arc this is provided for in a simple and desirable manner by shunting the field energizing current around the rheostat 144 until after the arc has been established.

Another advantage of the present invention is that the welding travel motor, being an adjustable speed direct current energized motor with shunt field regulation, may be operated at uniform velocity since it is in nowise affected by the fluctuations of the welding current. This method of operating the welding travel motor from an independent current source as compared with operation thereof by current shunted from the welding circuit has certain other advantages. In practical welding operations it is frequently desirable to vary the relation between feed of the electrode and the relative travel of the electrode and the work and I have found that this may be accomplished in a very desirable manner when the electrode feed motor and the travel motor are energized and controlled as herein described.

As regards the operation of the rapid travel motor 20 and the magnetic clutches 21 and 23, I have not considered it necessary to show or describe any particular electrical connections for this purpose since this is a matter of well known electrical practice and forms no substantial part of the present invention.

It will also be understood that the present description and drawings deal only with what I now consider to be the preferred embodiment of my invention and I, therefore, reserve the right to all desirable modifications falling within the scope and spirit of the appended claims. For example, in the case of circumferential seam welding the closure of the contacts 155 in response to operation of the arc-striking solenoid 155 may be utilized in various ways to operate suitable electrical controls for causing the work to travel relative to the electrode, the welding travel motor 30 remaining inoperative.

Having thus described my invention, what I claim is:—

1. Arc welding apparatus including electro-responsive means for operating the welding electrode to an arc striking position after the electrode has been initially engaged with the work to close the welding circuit, a constant potential source of current for energizing said means, a contactor functioning, when connected in circuit with said constant potential source, to complete connections for the supply of current from said source to said electro-responsive arc striking means, and a second contactor functioning, in response to flow of current in the welding circuit, to connect the first mentioned contactor in circuit with said constant potential source.

2. Arc welding apparatus as claimed in claim 1 including means for automatically open-circuiting the second contactor as the electrode is operated to an arc-striking position.

3. Arc welding apparatus as claimed in claim 1 including a pair of normally engaged contacts in series with the second contactor, and means for automatically separating said contacts to deenergize said contactor when the electrode is operated to an arc striking position.

4. Arc welding apparatus including motor operated electrode feed mechanism for feeding the welding electrode to the work, motor operated travel mechanism for effecting relative travel between the electrode and the work during the welding operation, a solenoid actuated arc striking mechanism for operating the electrode to an arc striking position following the initial engagement of the electrode with the work to close the welding circuit, a constant potential source of current for energizing the operating motor of the travel mechanism and the solenoid of the arc striking mechanism, means for energizing the motor of the electrode feed mechanism to effect contact of the electrode with the work to close the welding circuit, means acting in response to the resulting flow of welding current to connect the solenoid of the arc striking mechanism in circuit with said constant potential source whereby said mechanism functions to move the electrode to an arc striking position with reference to the work without interfering with subsequent feeding of the electrode toward the work during progress of the welding operation, and means controlled by the arc-striking feed mechanism for connecting the motor of the travel mechanism in circuit with said constant potential source after the arc is established.

5. Arc welding apparatus including a welding head assembly comprising a vertically disposed electrode guide tube, a vertically movable electrode arranged in said tube, a rotary drum, a flexible electrode suspending element connected between the drum and the upper end of the electrode, and means for controlling the turning speed of the drum in the direction necessary to lower the electrode toward the work.

6. Arc welding apparatus including a welding head assembly comprising a vertically disposed electrode guide tube, a vertically slidable electrode holder arranged in said tube, a guide sheave mounted at the upper end of said tube, a flexible element passing around said sheave and having one end attached to said holder, a drum to which the other end of said flexible element is attached so that the electrode travels downwardly in the tube by reason of its own weight when the drum is permitted to turn in one direction, and means for varying the speed at which the drum is permitted to turn in such direction.

7. Arc welding apparatus including a vertically disposed electrode guide tube, an electrode in said tube, an electrode feed mechanism including a drum and a flexible element having one end connected to the upper end of said electrode, and the other end connected to said drum, means for controlling rotation of the drum in an electrode lowering direction, and means for lifting a portion of the flexible element and the electrode to establish an arc between the electrode and the work after the electrode has been initially lowered into contact with the work to complete the welding circuit.

8. Arc welding apparatus including a welding head assembly comprising a frame, a vertically disposed electrode guide tube secured to said frame to project below and above the frame, a rotary drum mounted on said frame, a sheave mounted on the upper end of said tube, a flexible element passing over said sheave and having one end attached to said drum, an electrode arranged in said tube and having its upper end secured to the remaining end of said flexible element so that the weight of the electrode tends to turn the drum in a direction permitting downward movement of the electrode in said tube and means for controlling rotation of the drum in said direction.

9. Arc welding apparatus including a weld-head assembly comprising a vertically disposed electrode guide tube, a plate carried by the upper end of said tube, standards rising from said plate, a lever structure pivoted at one end to said standards, a sheave carried by said lever structure, a solenoid connected with the lever structure adjacent its opposite end to impart raising movement thereto when the solenoid is energized, an electrode arranged in said tube, a flexible element having one end attached to the upper extremity of said electrode, said flexible element being carried over said sheave and then downwardly alongside the electrode guide tube, a drum mounted below the upper end of said tube to which the remaining end of the flexible element is connected, means for controlling rotation of the drum in an electrode lowering direction in response to the weight of said electrode, and means for energizing said solenoid to elevate said sheave and the electrode supporting end of the flexible element to raise the electrode after the latter has been initially lowered into contact with the work.

10. Arc welding apparatus including a welding head assembly comprising a frame, an electrode feed motor mounted thereon, a speed reducer on said frame having its high speed shaft connected with the motor shaft, a drum loosely mounted on the low speed shaft of the speed reducer, an electrode guide tube secured to said frame with the upper end of the tube extending a considerable distance above the frame, an electrode arranged in said tube, a flexible element having one end secured to the upper extremity of said electrode and the other end secured to said drum, a sheave at the upper end of said tube over which the intermediate portion of the flexible element is passed, and a pawl and ratchet connection between the drum and the drum supporting shaft permitting the weight of the electrode to turn the drum in an electrode lowering direction at a rate of speed regulated by the operating speed of said motor.

11. Arc welding apparatus including a motor operated electrode feed mechanism functioning to initially feed the electrode to the work at a comparatively slow speed, electro-responsive arc striking mechanism for operating the electrode to an arc striking position after the electrode has been initially engaged with the work to close the welding circuit, said arc striking mechanism being electrically connected to function automatically in response to initial flow of current in the welding circuit, and adjustable means for regulating the speed at which the electrode is lowered towards the work by the electrode feed mechanism after the arc is established, said last mentioned means being rendered effective automatically in response to operation of the arc striking mechanism.

JOHN P. TRIPP.